Figure 1:

No. 749,077. PATENTED JAN. 5, 1904.
R. W. MEILY.
BARBED FASTENING DEVICE.
APPLICATION FILED AUG. 27, 1903.
NO MODEL.

Witnesses.
Robert Everett
[signature]

Inventor.
Ringgold W. Meily.
By James L. Norris
Att'y

No. 749,077. Patented January 5, 1904.

UNITED STATES PATENT OFFICE.

RINGGOLD W. MEILY, OF LIMA, OHIO.

BARBED FASTENING DEVICE.

SPECIFICATION forming part of Letters Patent No. 749,077, dated January 5, 1904.

Application filed August 27, 1903. Serial No. 170,983. (No model.)

*To all whom it may concern:*

Be it known that I, RINGGOLD W. MEILY, a citizen of the United States, residing at Lima, in the county of Allen and State of Ohio, have invented new and useful Improvements in Barbed Fastening Devices, of which the following is a specification.

This invention relates to a barbed fastening device; and the object of the invention is to provide a simple, effective, and inexpensive device of this character which may be employed with facility in a variety of ways. I have found in practice the article to be of particular advantage in securing stovepipes and their thimbles in their place, and in the drawings accompanying and forming a part of this specification will illustrate the device in conjunction with a stovepipe and its thimble.

In the following description I will set forth at length the structure of the device represented in said drawings, and at this point wish to state that I do not limit myself to the exact disclosure made thereby, for certain variations may be adopted within the scope of my claims succeeding the said description.

Figure 2:
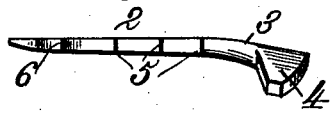
Figure 3:
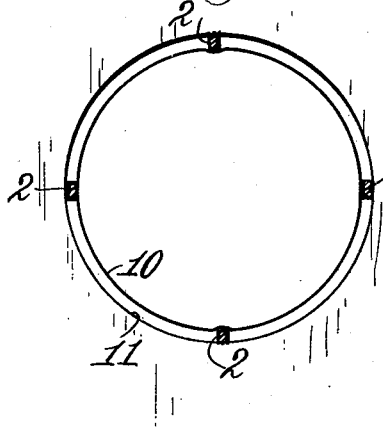
Figure 4:
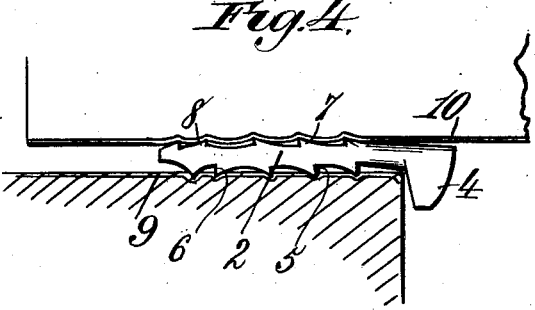

Referring to said drawings, Figure 1 is a side elevation of the barbed fastening device, hereinafter described. Fig. 2 is a top plan view of the same. Fig. 3 is a cross-sectional elevation of a stovepipe-thimble and a stovepipe passing through the same, illustrating also several of the fastening devices, one of them being in an operative position and another being in the position it occupies just before being turned to said operative position. Fig. 4 is a sectional plan view of said thimble, pipe, and fastening device, the latter being in its effective position.

Like characters refer to like parts throughout the several figures.

Referring more particularly to Figs. 1 and 2, wherein the fastening device is fully illustrated, I would remark that the latter is ordinarily and preferably made from tool or machine steel, so as to insure the barbs or teeth thereof biting into the surfaces of elements to be locked together. The invention, however, is not restricted in this respect, for other materials may be utilized in the manufacture of the article.

The fastening device includes in its structure a shank, as 2, which may be made of any desired length and which is somewhat flat, having teeth, as will hereinafter appear, on its opposite edges. What might be properly considered the outer side face of the shank is upon a slight bevel, it converging toward the inner end or point of the shank. By so beveling the shank its inner end is somewhat reduced, so as to facilitate the introduction of said inner end between two objects, such as between a stovepipe and its thimble. The outer end of the shank is laterally deflected, as at 3, and is provided with a head 4, of somewhat flat form and which is out of the plane of the shank for a purpose that will hereinafter appear. What is shown in Fig. 1 as the upper edge of the shank 2 has two series of teeth, which face or point in opposite directions. The series of teeth nearest the head 4 is denoted by 5, while the other series is denoted by 6. The teeth 5 face the head 4, while the teeth 6 face the pointed or forward end of the shank 2. What is shown in said Fig. 1 as the lower edge of the shank is provided with two series of teeth corresponding with the teeth 5 and 6 and denoted, respectively, by 7 and 8, the teeth 7, which are nearest the head 4, pointing away from said head, while the teeth 8, which are near the reduced end of the shank, point or face toward the said head.

As hereinbefore stated, the fastening device may be used in different ways; but it has been found of considerable importance in connection with stovepipes and their thimbles. In this use of the device it holds the thimble and pipe positively against endwise movement in opposite directions and also holds the pipe against lateral motion, so that it is not necessary to stay the latter.

In Figs. 3 and 4 of the drawings I have shown the device in the use indicated, and in this use the teeth 5 and 6 are adapted to bite into or penetrate the thimble, while the teeth 7 and 8 are adapted to bite into or penetrate the pipe. Referring to Fig. 3, the reduced inner end of the shank is introduced into the space between the stovepipe-thimble 9 and the pipe 10, passing into or through the same, and the shank is driven home until the head 4 thereof is in proximity to what might be considered the forward edge of the thimble. As the beveled outer face of the shank traverses the inner surface of the thimble the shank is given a slight lateral motion, so as to partially flatten down the pipe 10 and provide a surface into which the teeth 7 and 8 can readily enter. When the shank has been driven home, it is turned so as to cause the teeth 5 and 6 to enter the thimble and the teeth 7 and 8 to penetrate the slightly-flattened portion of the stovepipe. As the two series of teeth face or point in opposite directions there is absolutely no possibility of either the thimble, the pipe, or the fastening device itself moving in either direction longitudinally. The head 4 provides a ready means for turning the shank, and it may be engaged by any suitable implement, such as a wrench. It will be remembered that the head has been described as being out of the plane of the toothed or barbed portion of the shank 2, by reason of which when the said toothed portion is driven into place between the thimble and pipe the said head may be freely reached by a wrench to turn the shank either for the purpose of forcing the teeth into the thimble and pipe or for disengaging them therefrom when it is desired to withdraw the fastening device, and consequently the pipe and thimble. To facilitate the withdrawal of the fastening device, the head 4 thereof has a hole 11, into which a suitable implement may be inserted to pull the fastening device from place.

Any number of fastening devices may be employed in connection with the pipe and thimble. In some cases one will suffice to hold two parts firmly in place, while in others more may be required. In Fig. 2 a plurality of the fastening devices is shown in connection with the thimble and pipe therein illustrated.

From the foregoing description, taken in connection with the accompanying drawings, it will be observed that my improved fastening device includes a shank having oppositely-facing teeth on one of its edges, the side faces thereof being plain. The device is represented as having both edges provided with such teeth. As the side faces of the shank are plain, the fastening device can be readily driven into the space between a stovepipe and its thimble or between any other two parts that it is desired to fasten, and when said fastening device is in its proper position it can be turned so as to cause the teeth to bite into one or both of the parts which are to be fastened.

Having described the invention, what I claim is—

1. A fastening device including a shank having oppositely-facing teeth on one edge, the side faces thereof being plain.

2. A fastening device including a shank having oppositely-facing teeth on both its edges, the side faces thereof being plain.

3. A fastening device including a headed shank having oppositely-facing teeth on one edge, the side faces of said shank being plain.

4. A fastening device including a shank provided with a head, the shank having oppositely-facing teeth on one edge, the side faces thereof being plain, and said head being out of the plane of the toothed portion of the shank.

In testimony whereof I have hereunto set my hand in presence of two subscribing witnesses.

RINGGOLD W. MEILY.

Witnesses:
HEATH SUTHERLAND,
W. H. CLARKE.